United States Patent [19]
Laible

[11] Patent Number: 5,165,578
[45] Date of Patent: Nov. 24, 1992

[54] VENTED CLOSURE FOR A CONTAINER

[76] Inventor: Rodney Laible, Rural Rte. 1, Box 1, Bennington, Nebr. 68007

[21] Appl. No.: 693,147

[22] Filed: Apr. 29, 1991

[51] Int. Cl.$^5$ ............................................. B67D 5/68
[52] U.S. Cl. ................................... 222/189; 222/212; 222/481; 222/545; 137/859
[58] Field of Search .................... 222/212, 481, 481.5, 222/494, 189, 545; 137/859

[56] References Cited

U.S. PATENT DOCUMENTS

| | | | |
|---|---|---|---|
| 2,851,201 | 9/1958 | Poitras et al. | 222/481 |
| 3,194,263 | 7/1965 | Riester | 137/859 X |
| 3,409,160 | 11/1968 | Scott | 215/56 |
| 3,951,293 | 4/1976 | Schulz | 215/261 |
| 4,036,386 | 4/1977 | Nishioka | 215/260 |
| 4,057,177 | 11/1977 | Laauwe | 137/859 X |
| 4,168,012 | 3/1979 | Hawkinson | 220/209 |
| 4,646,945 | 3/1987 | Steiner et al. | 222/481 X |
| 4,722,450 | 2/1988 | Mario | 215/260 |
| 4,765,499 | 8/1988 | von Reis | 215/261 |
| 4,828,129 | 5/1989 | Jonkers | 215/260 |
| 4,896,789 | 1/1990 | Federspiel | 220/367 |
| 4,930,667 | 6/1990 | Holzner, Sr. | 222/481 X |

FOREIGN PATENT DOCUMENTS 0589163  1/1978  U.S.S.R. .
486673  6/1938  United Kingdom .

Primary Examiner—Gregory L. Huson
Attorney, Agent, or Firm—John A. Beehner

[57] ABSTRACT

A vented closure apparatus for a container having an open ended neck, including a cap having a top wall and a generally tubular sidewall depending therefrom and adopted for attachment to the neck of a container. The cap further has an aperture through which liquid may flow from a container onto which the cap is secured. The closure further includes a flow control insert insertable into the cap and operative to control flow through the aperture, the insert and cap being of respective sizes and shapes to define a generally closed chamber therebetween. The cap has a gas passage hole in communication with the top of the chamber and the insert has a hole in communication with the bottom of the chamber. A seal divides the chamber into an upper gas discharge chamber and a lower liquid containment chamber, the seal being operative to allow air to pass therethrough in response to a differential pressure existing between the atmosphere within and without a container equipped with the closure, but operative to prevent liquid flow therethrough.

16 Claims, 2 Drawing Sheets

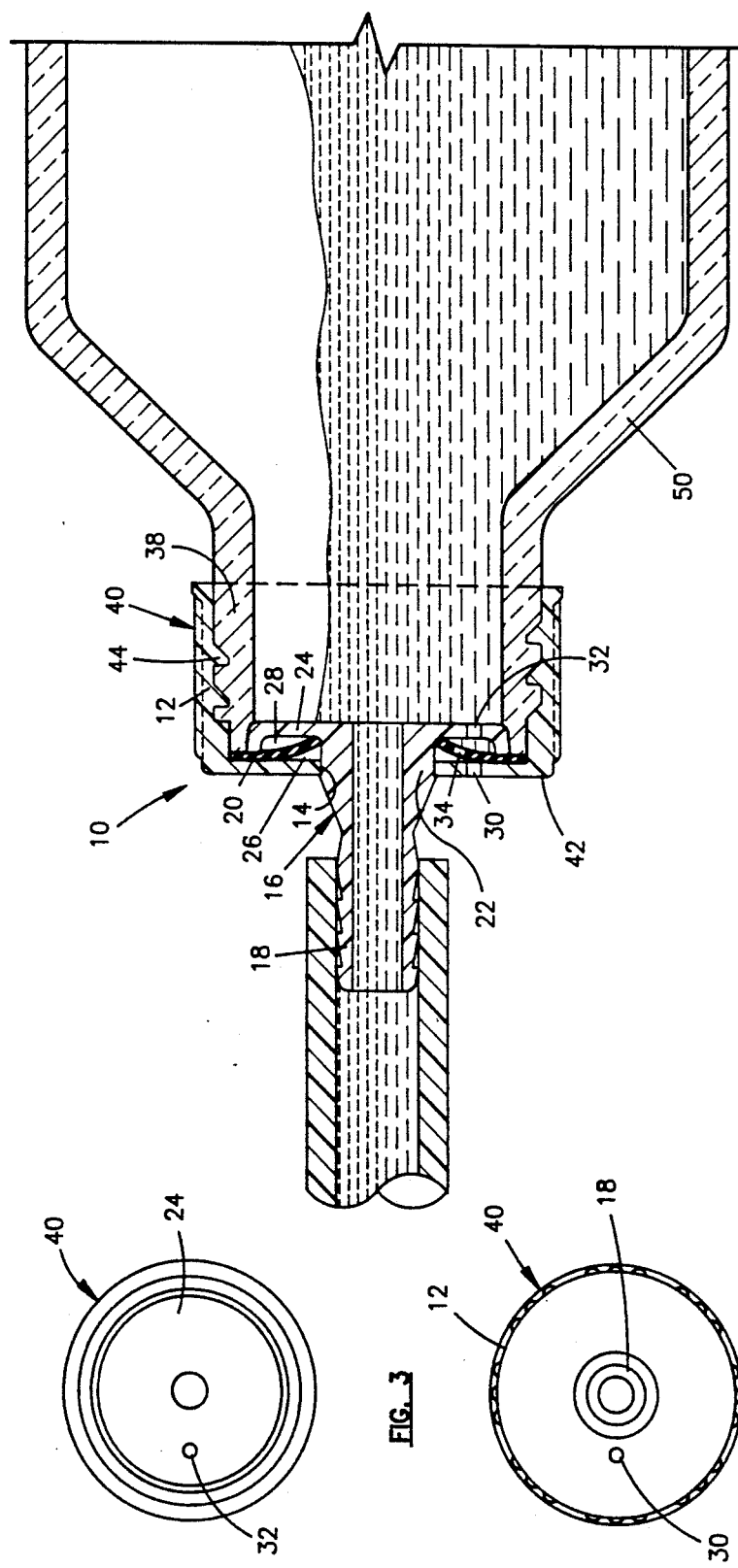

VENTED CLOSURE FOR A CONTAINER

BACKGROUND OF THE INVENTION

The present invention is directed generally to a vented closure for a container. The container may be of the type adapted to hold any variety of liquids or even flowable solids. More specifically, the invention is directed to a closure capable of effecting a fluid tight seal on a container, yet permitting the flow of air into and out of the container in response to a differential pressure between the atmosphere inside and outside the container, thereby eliminating such differential.

Differential pressures may exist in one of two ways. Either the pressure inside the container exceeds that outside the container, or the pressure outside exceeds that which is inside. In the former situation, air must be allowed to escape from the container in order equalize the pressures. Conversely, when the pressure outside exceeds the inside pressure, air must be allowed in.

The situation where the pressure outside the container exceeds the inside pressure is most frequently encountered when liquid is being dispensed from the container. As liquid is dispensed, a partial vacuum is created within the container. This partial vacuum is eliminated by allowing air to flow into the container, replacing the volume of liquid which is being dispensed therefrom. If there is no airtight seal on the container, the air will be drawn into the container simultaneously with the dispensing of the liquid. Conversely, if the container has an airtight seal, preventing the flow of air into the container while fluid is dispensed, pressure will not be equalized until dispensing is interrupted, and air is allowed to flow into the container through he dispensing aperture. This prevents an even flow of liquid from the container. In some closed systems, the vacuum created within the container may become so great that further dispensing of fluid from the container is not possible until the vacuum is eliminated. This may require a partial disassembly of the system resulting in lost time and frustration.

The second differential pressure situation is where the pressure inside the container exceeds the pressure of ambient atmosphere. This may be encountered due to some chemical reactions occurring within the container causing gases to be generated. Alternatively, a change in elevation of the container, such as in an airplane cabin, or even the physical movement of the container, such as with carbonated liquids, may cause pressure to build up in the container. The build up in pressure within the container can have various effects depending on the nature of the container and the amount of pressure built up. In one frequently encountered situation the contents of the container, or at least a portion thereof, may be expelled when the container is finally opened. In a far more serious situation, if the pressure builds up sufficiently, the container may rupture causing potentially serious injury to bystanders.

Several prior art venting closures have been invented for containers. The majority of these prior art devices are designed to vent externally. That is, the apparatus will allow gas generally within the container to pass to the outside, but will not equalize a differential existing where the external pressure exceeds the internal pressure. Illustrative of the devices are U.S. Pat. No. 4,828,129 issued to Jonkers, May 9, 1989; 4,765,499 issued to von Reis et al., Aug. 23, 1988; 4,722,450 issued to Mario, Feb. 2, 1988; 4,168,012 issued to Hawkinson, Sep. 18, 1979; 3,409,160 issued to Scott, Nov. 5, 1968; and British Patent No. 486,673 issued to The Parozone Co. et al., Jun. 9, 1938. Another prior art closure, U.S. Pat. No. 4,036,386 issued to Nishioka et al., Jul. 19, 1977, allowed the venting of gas into the container, but made no provision for venting to the outside. Still other closures have allowed venting in both directions, but like those cited above, have not made any provisions for a dispensing means integrated as part of the closure. Illustrative of the last category of devices is U.S. Pat. No. 4,896,789 issued to Federspiel, Jan. 30, 1990; 3,951,293 issued to Schulz, Apr. 20, 1976; and Soviet Patent No. 589,163 issued to Nikitaev et al., Jan. 25, 1978. Additionally, some of the above devices (e.g., Scott) have the limitation that they will not allow venting when the container is upside down, or on its side.

Accordingly, it is a primary objective of the present invention to provide a vented closure which will allow gas to flow into and out of the container in response to a pressure differential, thereby increasing safety.

Another objective of the present invention is to provide a vented closure which will allow gas to flow into and out of the container in response to a pressure differential, while providing a liquid-tight seal, thereby preventing liquid from leaking from the container when it is tipped on its side or upside down.

Another objective of the present invention is to provide a means of dispensing liquid from a container while simultaneously allowing air to flow into the container thereby achieving continuous pressure equalization and an even flow of liquid.

Another objective of the present invention is to provide a closure which is easy to use, inexpensive to manufacture and adaptable to a variety of containers.

SUMMARY OF THE INVENTION

The present invention is directed to a vented closure apparatus for a container. The apparatus comprises a fluid flow control insert, a cap and an annular seal.

The cap comprises a top wall having an aperture therein for receiving the flow control insert, a generally tubular sidewall depending therefrom and an attachment means for attaching the apparatus to the neck of a container. The top wall has at least one gas passage hole providing communication with the annular seal.

The fluid control insert comprises a circular base portion, a raised annular flange extending along the outermost circumference of the base, and a raised flow control portion. The fluid flow control insert is operative to control the flow of liquid through the cap aperture. The base has at least one fluid passageway providing communication with the annular seal. The flange forms an annular chamber when joined with the cap and base. The raised flow control portion may be either a generally tubular dispensing member, which would allow liquid to be dispensed from the container, or it may be a plug which would seal the container and prevent liquid from being dispensed.

The annular seal is compressed between the cap top wall and the flange of the flow control insert and the container neck. The radial extent of the annular seal is slightly oversized such that when inserted between the container, flange and cap, it extends into the chamber formed by the flange, the top wall and the raised flow control portion, separating it into an upper gas discharge chamber and a lower fluid containment chamber. The dimensions of the seal are such that it affords a fluid tight seal against the upstanding column of the raised flow control portion. The fluid passageway in the circular base allows the container and underside of the seal to be in fluid communication. The gas passageway on the seal is sufficiently large to allow the passage of gas through the seal, but small enough to prevent the flow of liquid therethrough. There is no need for the holes in the cap top wall or the insert base to be registered with the hole in the seal ring since the design of the chamber renders them in communication at all times.

The invention allows gas to pass into and out of the container in response to differential pressures existing within and without the container. If the raised flow control portion is a liquid dispensing tube, the invention allows air to flow into the container during the dispensing process thereby achieving an even flow of the liquid therefrom. If the raised flow control portion is a plug, the invention prevents flow or leakage of liquid from the container, even if tipped on its side or upside down.

BRIEF DESCRIPTION OF THE DRAWINGS

FIG. 3 is a bottom view of the closure cap.

FIG. 4 is a top plan view of the closure cap.

FIG. 5 is a perspective view of the seal ring.

FIG. 6 is an enlarged partial cross-sectional view taken through the central axis of the closure installed on a container, showing the operation of the closure allowing liquid to be dispensed but preventing flow past the seal.

FIG. 7 is a cross-sectional view of the plug used in an alternate embodiment of the invention.

DESCRIPTION OF THE PREFERRED EMBODIMENT

Figure 2:
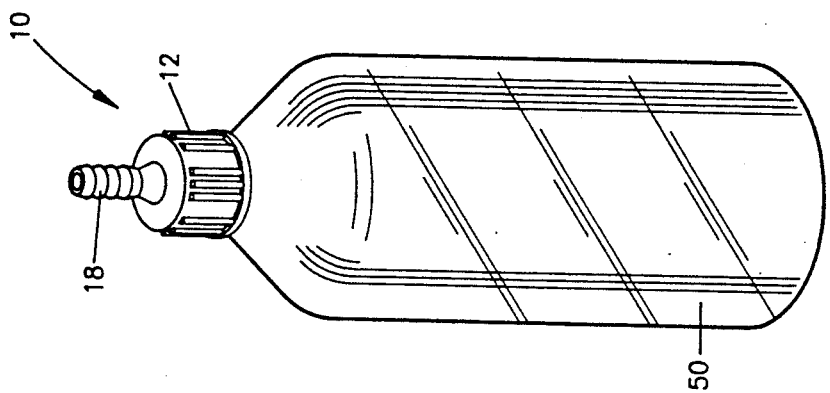
FIG. 2 is a view showing the vented closure of the invention on a container.
Figure 1:
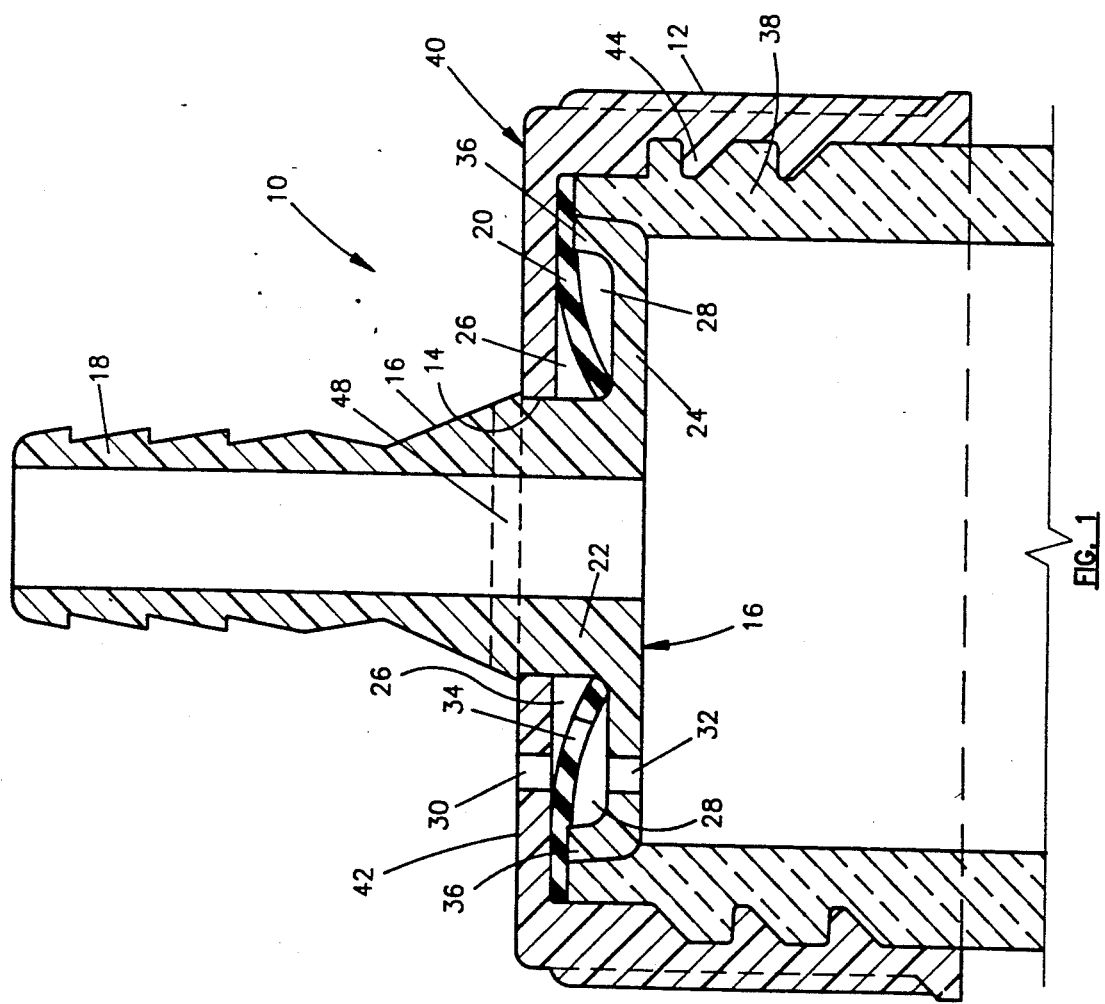
FIG. 1 is an enlarged partial cross-sectional view taken through the central axis of the container opening of the invention showing the neck of a container, the cap, fluid control insert and seal ring.

A vented closure apparatus 10 is shown in FIG. 1 threaded onto the neck 38 of a container 50. The container 50, may be of any generally available design so long as the neck 38 is of a size and shape for connection to closure 10. Closure 10 is designed to allow the venting of gas built up within the container, thereby equalizing pressure within and without the container, while at the same time preventing the liquid contained within the container from flowing out, unless such flow is desired. Additionally, the cap allows the flow of gas into the container, in order to equalize the pressure differential resulting from a partial vacuum therein.

The vented closure 10, comprises a fluid flow control insert 16, a cap 40, and an annular seal 20.

The annular seal 20 comprises a sealing ring having at least one gas passage hole 34. In the preferred embodiment, the ring 20, is constructed of a foam material and is approximately 0.02 inches thick. The annular seal 20, is compressed between the cap top wall 42, the flange 36, and the container neck 38, as shown best in FIG. 1. The annular seal 20 is slightly oversized in diameter such that when inserted between the container neck 38, flange 36, and cap top wall 42, it extends into the chamber formed by the flange 36, the top wall 42, and the raised flow control portion 22, separating it into an upper gas discharge chamber 26, and a lower fluid containment chamber 28. The dimensions of the seal 20, are such that it affords a fluid tight seal against the upstanding column of the raised flow control portion 22. The fluid passageway 32, in the circular base 24, allows the fluid containment chamber 28, and the lower side of the seal 20, to be in fluid communication with the contents of the container 50. The gas passageway in the seal 34, is sufficiently large to allow the passage of gas, but small enough to prevent the flow of liquid therethrough. The seal 20, thereby effectively prevents liquid flow to the upper gas discharge chamber 26. There is no need for the hole 30 in the cap top wall 42, or the hole 32 in the insert base 24, to be registered with the hole 34, in the seal ring 20, since the annular design of the chambers render them in communication at all times. The seal ring 20 may be constructed of any suitable material and in the preferred embodiment is a 0.02 inch thick foam material. Additionally, the diameter of the gas passageway 34, in the seal ring 20, may be varied to accommodate liquids of various viscosities. Some open cell foam materials inherently provide communication of gas through the material while blocking liquid flow therethrough. A seal made of such foam material need not have a separate hole 34 formed therein since such holes are inherently present in the material.

The cap 40 comprises a top wall 42 a generally tubular sidewall 12 depending therefrom, and an attachment means 44 for attaching the closure 10 to the container 50. In the preferred embodiment, the attachment means 44, comprises threads to threadably engage the neck 38 of the container 50, which threads are integrally formed on the interior of cap sidewall 12. The cap 40 further comprises at least one gas passage hole 30 in the top wall 42 of the cap 40, and a large aperture 14 for receiving the flow control insert 16.

The fluid flow control insert 16 comprises a circular base portion 24, a raised flow control portion 16, a raised annular flange 36, and a fluid passage hole 32 in the circular base 24. When joined with the top wall 42 of the cap 40, the fluid flow control insert 16 defines a preferably annular chamber surrounding the raised flow control portion 16. The chamber is divided into an upper gas discharge chamber 26 and a lower fluid containment chamber 28 by the seal ring 20 which is adapted to be compressed between the raised annular flange 36, the container neck 38 and the top wall 42 of the cap 40. If the container 50 is accidentally tipped over, or turned upside down, the liquid in the container 50 may flow through the fluid passageway 32 and into the fluid containment chamber 28, but the size and shape of the gas passage hole 34 in the annular seal ring 20 will prevent the flow of liquid therethrough. Conversely, any gas generated by the liquid in the container 50 will pass freely through the fluid passageway 32, into the fluid containment chamber 28, through the gas passageway 34 and into the gas discharge chamber 26 and finally to the outside, through the gas passageway 30 in the cap 40 top wall 42, thereby equalizing the pressures within and without the container 50. Similarly, if a partial vacuum is created inside the container, such as when liquid is removed therefrom, gas may pass through the gas passageway 30 into the gas discharge chamber 26, through the gas passageway 34 in the seal ring 20 into the fluid containment chamber 26, through the gas passageway 34 in the seal ring 20 into the fluid containment chamber 28 and finally through the fluid passageway 32 and into the container 50. In the preferred embodiment, the diameter of the hole 30 in cap 40 and hole 32 in the insert base 24 is 0.06 inches.

In one embodiment the raised flow control portion 22 may be a generally tubular member 18 which will allow liquid to be dispensed from the container 50. In the preferred embodiment, if the raised flow control portion 22 is a generally tubular member to allow liquid dispensing from the container, it will be a cannula. The cannula may be frictionally engaged with a rubber hose or the like, to facilitate the dispensing of the liquid.

In a second embodiment of the invention, the raised flow control portion 22 comprises a plug 46, as shown in FIG. 7, which will prevent the dispensing of liquid from the container 50. The plug 46 will be inserted through the aperture 14 in the cap 40, as shown in FIG. 1, but instead of the generally tubular member 18, the plug will comprise a generally flat piece 48. The plug 46 provides a complete fluid-tight seal of the container 50, preventing the dispensing of any liquid therefrom, but allowing gas to flow into and out of the container 50 in response to pressure differentials.

The operation of the invention in the dispensing embodiment is best shown in FIG. 6. As can be seen in the figure, the raised flow control portion 22 comprises a generally tubular dispensing member 18, and liquid is dispensed via the hole therethrough. In response to gravitational forces, the liquid may also pass through the fluid passageway 32 in the insert base 24, and into the fluid containment chamber 28. However, the seal ring 20 and the gas passage hole therethrough 34, prevent the liquid from passing into the gas discharge chamber 26. Conversely, any gas generated by the liquid in the container 50 will pass freely through the fluid passageway 32, into the fluid containment chamber 28, through the gas passageway 34 and into the gas discharge chamber 26 and finally to the outside, through the gas passageway 30 in the cap top wall 42, thereby equalizing the pressures within and without the container 50. Similarly, if a partial vacuum is created inside the container, such as when liquid is removed therefrom, gas may pass through the gas passageway 30 into the gas discharge chamber 26, through the gas passageway 34 in the seal ring 20 into the fluid containment chamber 28 and finally through the fluid passageway 32 and into the container 50. Therefore, the vented cap apparatus 10, allows the atmospheric pressures inside and outside the container 50 to be equalized, regardless of whether the relatively greater pressure exists inside or outside the container 50.

Whereas the invention has been shown and described in connection with preferred embodiments thereof, it is apparent that many modifications, additions and substitutions may be made which are within the intended broad scope of the appended claims.

Thus there has been shown and described a vented closure for a container which accomplishes at least all of the stated objectives.

I claim:

1. A vented closure for a liquid container comprising:
    a liquid flow control insert for controlling the flow of liquid from a container;
    a cap having a top wall and an aperture therein for receiving said liquid flow control insert and attachment means for attaching said cap to a container;
    an annular seal between said cap and said liquid flow control insert and operative to allow air to pass therethrough into the container in response to a differential pressure existing between the atmosphere within and outside the container but capable of preventing the flow of liquids therethrough;
    said annular seal further comprising a seal ring having at least one gas passage hole therethrough, said hole being of a size and shape to block the flow of a liquid therethrough; and
    said liquid flow control insert further comprising a circular base portion and a raised flow control portion adapted for insertion through said aperture, said base portion including a raised annular flange extending along the outermost circumference of said base portion and further including at least one liquid passage hole in said circular base portion for allowing liquid flow through said base portion to said seal ring.

2. The apparatus of claim 1 wherein said cap and liquid flow control insert cooperate to define a chamber therebetween, said cap further comprising at least one gas passage hole for gas flow through said cap to said seal ring.

3. The apparatus of claim 2 wherein said raised flow control portion comprises a plug operative to fill said aperture and prevent the dispensing of liquid from the container.

4. The apparatus of claim 2 wherein said raised flow control portion further defines a liquid dispensing passageway therethrough.

5. The apparatus of claim 4 wherein said seal ring is slightly oversized thereby affording a fluid-tight seal against said raised flow control portion and causing said chamber to be divided into an upper gas discharge chamber and lower liquid containment chamber.

6. The apparatus of claim 5 wherein said seal ring is of a diameter to substantially fill said cap top wall and to overlie said raised annular flange whereby said seal ring is adapted to be compressed between said raised annular flange, the container and said top wall of the cap, thereby forming a seal with the container.

7. The apparatus of claim 6 wherein said seal ring is constructed of a foam material.

8. The apparatus of claim 7 wherein said raised flow control portion comprises a cannula.

9. A vented closure for a container having an open ended neck, said closure comprising:
    a cap having a top wall, a generally tubular sidewall depending therefrom and attachment means for securing said cap onto a neck of a container,
    said cap having an aperture through which liquid may flow from a container onto which said cap is attached,
    a flow control insert insertable into said cap and operative to define a flow path through said aperture,
    said insert and cap being of respective sizes and shapes to define a generally closed chamber therebetween positioned between said aperture and said generally tubular sidewall of said cap,
    said cap having a gas passage hole in communication with said chamber,
    said insert having a hole in communication with said chamber, a seal in said chamber and operative to divide said chamber into an upper gas discharge chamber and a lower liquid containment chamber,
    said seal being operative to prevent a liquid flow therethrough and to allow air to pass therethrough in response to a differential pressure existing between the atmosphere within and outside a container equipped with said closure,
    said seal including a gas passage hole of a size and shape to block a liquid flow therethrough, said chamber and seal comprising generally annular shapes, and said seal comprising a generally flat annular seal ring slightly oversized relative to said chamber such that upon insertion into said chamber, said seal ring is bowed between the interior and exterior periphery thereof.

10. The apparatus of claim 9 wherein said annular seal further comprises at least one gas passage hole therethrough, said hole being of a size and shape to block the flow of liquid therethrough.

11. The apparatus of claim 9 wherein said liquid flow control insert includes a circular base portion and raised flow control portion adapted for insertion through said aperture, said base portion including a raised annular flange extending along the outermost circumference of said base portion and further including at least one liquid passage hole in said circular base portion thereby allowing liquid flow through said base portion to said seal ring.

12. The apparatus of claim 11 wherein said raised flow control portion comprises a plug.

13. The apparatus of claim 11 wherein said raised flow control portion comprises a generally tubular member.

14. The apparatus of claim 13 wherein said raised flow control portion comprises a cannular.

15. In combination,
a container capable of holding liquid and having an open ended neck;
a vented closure for said container comprising;
a cap having a top wall, a generally tubular sidewall depending therefrom and attachment means for securing said cap onto said neck of said container,
said cap having an aperture through which liquid may flow from said container onto which said cap is attached,
a flow control insert insertable into said cap and operative to define a flow path through said aperture,
said insert and cap being of respective sizes and shapes to define a generally closed chamber therebetween positioned between said aperture and said generally tubular sidewall of said cap,
said cap having a gas passage hole in communication with said chamber,
a seal insertable into said chamber and operative to divide said chamber into an upper gas discharge chamber and a lower liquid containment chamber,
said seal being operative to prevent a liquid flow therethrough and to allow air to pass therethrough in response to a differential pressure existing between the atmosphere within and without said container equipped with said closure,
said seal including a gas passage hole of a size and shape to block a liquid flow therethrough.
said chamber and seal comprising generally annular shapes, and
said seal comprising a generally flat annular seal ring slightly oversized relative to said chamber such that upon insertion into said chamber, said seal ring is bowed between the interior and exterior periphery thereof.

16. The combination of claim 15 wherein said open ended neck of said container and said attachment means comprise threads such that said neck and said cap may be threadably engaged and wherein said neck is of a size and shape such that said insert is frictionally engaged with the interior surface of said neck when said closure is installed on said container.

* * * * *